United States Patent
Guidi

(10) Patent No.: US 12,018,138 B2
(45) Date of Patent: Jun. 25, 2024

(54) COMPOSITION, IN PARTICULAR A COMPOSITION THAT CAN BE USED AS PAINT FOR COATING SURFACES OF SHEETS OR COMPONENTS

(71) Applicant: Carcano Antonio S.p.A., Mandello del Lario (IT)

(72) Inventor: Annalisa Guidi, Lecco (IT)

(73) Assignee: CARCANO ANTONIO S.P.A., Mandello del Lario (IT)

( * ) Notice: Subject to any disclaimer, the term of this patent is extended or adjusted under 35 U.S.C. 154(b) by 533 days.

(21) Appl. No.: 17/126,492

(22) Filed: Dec. 18, 2020

(65) Prior Publication Data

US 2021/0214529 A1    Jul. 15, 2021

(30) Foreign Application Priority Data

Dec. 20, 2019 (IT) .................. 102019000025168

(51) Int. Cl.
| | | |
|---|---|---|
| C09D 167/00 | (2006.01) | |
| A01N 33/04 | (2006.01) | |
| A01N 43/80 | (2006.01) | |
| A01N 47/12 | (2006.01) | |
| A01N 55/02 | (2006.01) | |
| A01N 59/16 | (2006.01) | |
| C08K 13/06 | (2006.01) | |
| C08L 63/00 | (2006.01) | |
| C08L 67/00 | (2006.01) | |
| C09D 163/00 | (2006.01) | |

(52) U.S. Cl.
CPC .............. *C08K 13/06* (2013.01); *A01N 33/04* (2013.01); *A01N 43/80* (2013.01); *A01N 47/12* (2013.01); *A01N 55/02* (2013.01); *A01N 59/16* (2013.01); *C08L 63/00* (2013.01); *C08L 67/00* (2013.01); *C09D 163/00* (2013.01); *C09D 167/00* (2013.01)

(58) Field of Classification Search
None
See application file for complete search history.

(56) References Cited

U.S. PATENT DOCUMENTS

| 4,714,801 | A | * | 12/1987 | Koblitz | .............. | H01R 13/5216 |
|---|---|---|---|---|---|---|
| | | | | | | 524/319 |
| 2009/0120328 | A1 | * | 5/2009 | Michael | ................ | C09C 1/3081 |
| | | | | | | 106/481 |
| 2010/0093884 | A1 | | 4/2010 | Spyrou et al. | | |
| 2012/0058345 | A1 | * | 3/2012 | Gidcumb | ............... | B05D 7/536 |
| | | | | | | 524/502 |
| 2012/0183787 | A1 | * | 7/2012 | Nagelsdiek | ....... | C08F 222/1065 |
| | | | | | | 106/170.2 |
| 2021/0371697 | A1 | * | 12/2021 | Turley | ................. | C09D 167/00 |

FOREIGN PATENT DOCUMENTS

CA          2973860 A1 *  2/2018  .............. C09D 5/00

OTHER PUBLICATIONS

Search Report for IT 102019000025168 dated Jul. 6, 2020 (6 pages).

* cited by examiner

*Primary Examiner* — Michael J Feely
(74) *Attorney, Agent, or Firm* — Tutunjian & Bitetto, P.C.

(57) ABSTRACT

The present invention relates to a composition including at least one hydrophobic silica present at a percentage by weight between 1 and 60% of the total weight of the composition, and at least one epoxy or polyester polymer resin present at a percentage by weight between 20 and 80% of the total weight of the composition.

24 Claims, 2 Drawing Sheets

COMPOSITION, IN PARTICULAR A COMPOSITION THAT CAN BE USED AS PAINT FOR COATING SURFACES OF SHEETS OR COMPONENTS

TECHNICAL FIELD OF THE INVENTION

The present invention relates to a new composition, which in particular can be used as a paint for coating surfaces of sheets or components made of copper, steel, iron, aluminum, polymer or glass, as well as a method for obtaining this composition.

STATE OF THE PRIOR ART

Many compositions are known for the production of paints to be applied as a coating on panels in general, each of which is obtained by means of respective processes.

Moreover, the processes for obtaining known compositions require a great deal of attention during all the manufacturing steps to avoid the formation of undesirable and harmful precipitates as well as the de-mixing of the components used, and this often makes them difficult to be replicated at an industrial level.

US2010093884A1 teaches a solution according to the state of the prior art.

SUMMARY OF THE INVENTION

The main object of the present invention is therefore to provide a new composition for the obtainment, in particular, of paints for coatings surfaces of sheets or components made of materials, such as copper, steel, iron, aluminum, polymer or glass, as well as a method of obtainment of this composition.

Another object of the present invention is to provide a composition as indicated above which is stable.

Another object of the present invention is to provide a composition as above indicated which ensures good constrain to a respective substrate.

Another object of the present invention is to provide a new method for obtaining a composition as indicated above, which is simple and quick to carry out, without the risk of precipitates and de-mixing.

Another object of the present invention is to provide a new method for obtaining a composition as above indicated, which is easily reproducible on an industrial level.

According to an aspect of the invention, a composition according to the present application is provided.

The present application refers to preferred and advantageous embodiments of the invention.

BRIEF DESCRIPTION OF THE DRAWINGS

Other features and advantages of the invention will be more evident from the following description, also referring to the accompanying drawings in which.

DETAILED DESCRIPTION OF THE INVENTION

Figure 1:
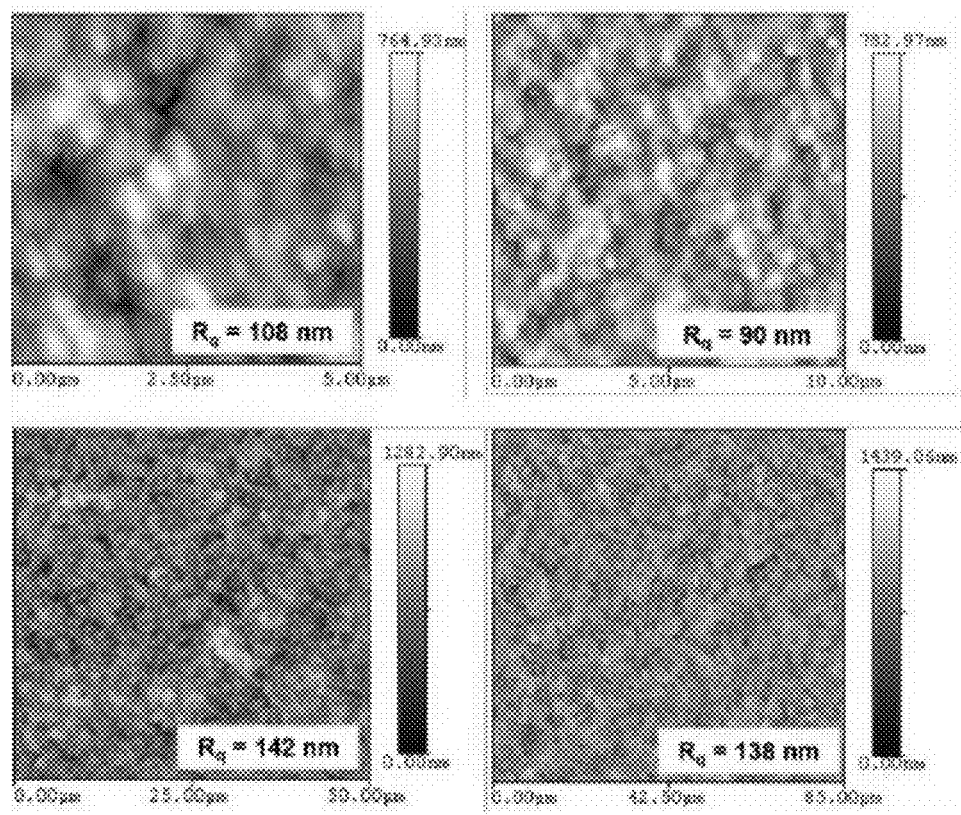
FIGS. 1 and 2 illustrate samples treated with a composition according to the present invention.

The present invention relates to a composition comprising:
at least one hydrophobic silica present at a percentage by weight between 1 and 60%, if desired between 30% and 60%, for example between 40% and 50%, advantageously between 45% and 47% of the total weight of the composition,
at least one epoxy or polyester polymer resin present at a percentage by weight between 20 and 80%, if desired between 40% and 70% or between 40% and 60%, advantageously between 51% and 53% of the total weight of the composition, and
at least one anchoring agent at a percentage by weight between 0.5 and 2%, if desired between 0.8% and 1%, advantageously between 0.92% and 0.98% of the total weight of the composition, which anchoring agent is arranged to increase the anchoring of the composition to a substrate.

The at least one hydrophobic silica comprises at least one pyrogenic silica, and thus a silica obtained by pyrolysis.

Advantageously, the pyrogenic silica comprises at least pyrogenic silica treated with dimethyldichlorosilane and/or polyacrylate-modified silicone with —OH functional groups.

Preferably, a mixture of silicas is thus provided.

Preferably, if a pyrogenic silica treated with dimethyldichlorosilane is present, it has a content of $SiO_2$ equal to 99.5-99.9%, for example greater or equal to 99.8%.

Pyrogenic silica treated with dimethyldichlorosilane exhibits high hydrophobic properties. It has the following characteristics:
specific surface area (BET)=90-130 g/m$^2$
pH 4% in dispersion=3.6-5.5

The silicone modified with polyacrylate with functional groups —OH provides an increase in hydrophobic and oleophobic properties, i.e., it is water-repellent and oil-repellent.

This additive can improve the anti-graffiti and tape-realise performance.

Advantageously, the composition comprises even at least one biocidal agent present at a percentage by weight between 0.05 and 0.3%, if desired between 0.1 and 0.2%, advantageously 0.15 and 0.17% of the total weight of the composition.

The biocidal agent can include an antibacterial, antifungal, anti-mould, anti-algae and/or virucidal agent.

In this respect, the biocidal agent can comprise at least one compound selected from group consisting of zinc pyrithione, silver ions and isothiazolinone.

The virucidal agent, if the same is present, can comprise:
a mixture of 1,2-Benzisothiazol-3 (2H) and 1,2-Benzisothiazolin-3-one, which are not-halogenated Benzisothiazolin,
a mixture of N-(3-aminopropyl)-N-dodecylpropane-1,3-diamine, and/or
a mixture of 3-iodo-2-propinyl butylcarbamate and 3-iodoprop-2-in-1-butylcarbamate.

A composition according to the present invention at room temperature is in a liquid or even powdered state.

A composition according to the present invention can also include a solvent, if desired between 20% and 40%, for example 30% by weight on the total weight of the composition, such as MEK, ethyl acetate, acetone or butyl, which is arranged to control or adjust the viscosity of the composition in particular during its production process.

If a solvent is provided, then the percentages indicated in this description for the hydrophobic silica, the polymer resin, the biocidal agent and the anchoring agent or other indicated components refer to the weight of that element relative to the total weight of the composition without solvent or in any case without considering the weight of the solvent.

The composition may then include an additive to impart a bleach or opaque color to the formulation. In this regard, at least one bleaching/opacifying agent can be provided, for example selected from the group consisting of paraffin, talc, anhydrous citric acid, silicas and silanes.

The bleaching/opacifying agent can be introduced into the formulation in a very small percentage, usually around 0.5-3% by weight of the total weight of the composition, for example about 1%. Higher percentages could adversely affect the adhesion of the coating obtainable through the composition.

The whitening agent must not contain titanium dioxide, as this component could have negative effects regarding hydrophobicity. An adhesion promoter can then be included in the composition, if desired consisting of a mixture of phosphoric acid, butyl alcohol and, if desired, other alcohols.

The composition can also be obtained by adding a functional agent, if desired phosphoric acid designed to lower the pH.

According to a preferred but not limitative embodiment, a composition according to the present invention includes:
- at least one hydrophobic silica, preferably partly in powder and partly in the liquid state, present at a percentage by weight equal to about 46.3% of the total weight of the composition,
- a polymeric resin, preferably in the liquid state, present at a percentage by weight equal to about 52.6% of the total weight of the composition,
- a biocidal agent, preferably in the liquid state, present at a percentage by weight equal to about 0.16% of the total weight of the composition, and
- an anchoring agent, preferably in the liquid state, at a percentage by weight equal to about 0.94% of the total weight of the composition.

Subject-matter of the present invention is also the use of a composition as above indicated as paint for coating surfaces of sheets or components made of copper, steel, iron, aluminum, polymer or glass.

Advantageously, the use of a composition according to the present invention is as paint for coating
- surfaces of glass substrates or sheets or components such as hydrophobic and satin finish paint,
- surfaces of aluminum substrates or sheets or components for the formation of panels made of polyurethane foam,
- inner or outer panels made of copper, steel, iron, aluminum, or
- corrugated roofs, cladding panels or roofs in general.

The subject-matter of the present invention is also a coating or paint obtained by applying a composition as indicated above on a substrate or sheet or component, if desired made of copper, steel, iron, aluminum, polymer or glass as well as a substrate or sheet or component, if desired made of copper, steel, iron, aluminum, polymer or glass, provided with such a coating or paint.

A composition according to the present invention can be obtained for example with a method comprising the following steps:
- providing at least two reactors, if desired cylindrical bins of 200 L, for example internally coated with a layer of Teflon,
- inserting a first part of the liquid polymeric resin (if desired about 40% or 50% by weight of all the polymeric resin used), particularly a polyester based resin, into a first reactor of the two reactors,
- activating a first stirrer or impeller, if desired cowls in the first reactor, at a speed of about 500-1000 rpm, if desired 800-960 rpm, with impeller frequency in the range between 50 and 60 Hz before or after the insertion of the polymer resin,
- adding at least one first portion of hydrophobic powdered silica in the first reactor at room temperature while keeping the first stirrer activated so as to place the first polymeric resin part and the first portion of hydrophobic silica under stirring and mixing with one another, the hydrophobic silica being added slowly (if desired by dispersion with a sieve), so as to facilitate the complete and homogeneous dispersion thereof in the first polymeric resin part,
- inserting a second liquid polymeric resin part (if desired about 40% or 50% by weight of all the polymeric resin used) into a second reactor of the two reactors,
- activating, before or after the insertion of the second polymeric resin part, a second stirrer or impeller, if desired cowles in the second reactor, at a speed of about 500-1000 rpm, if desired 800-960 rpm, with impeller frequency in the range between 50 and 60 Hz,
- Subsequently, a second portion equal to about 30% of the hydrophobic silica, the biocidal agent and the anchoring agent are inserted into the second reactor while keeping a respective second stirrer activated so as to subject the second polymeric resin part, the second hydrophobic silica part, the biocidal agent and the anchoring agent to stirring and mixing with one another.

If a bleaching/opacifying agent is provided, it is preferably added as the last component. This additive can be in the form of liquid or powder, most often it is a powder.

Once this powder is added to the formulation, the reactor must be left, for example internally coated with Teflon, under constant stirring, if desired with a cowles impeller, for 20-30 minutes and then the viscosity can be checked, for example with a Ford cup 4. If necessary, it is possible to adjust the viscosity, in particular by lowering it with solvent additions while stirring.

The stirring in the first and/or second reactor can be high, for example at a speed of about 500-1000 rpm, if desired 800-960 rpm, with the impeller frequency in the range between 50 and 60 Hz.

Advantageously, the following components are inserted in the second reactor:
- polyacrylate-modified silicone such as hydrophobic silica, which is preferably added slowly,
- an adhesion promoter based on orthophosphoric acid as anchoring agent and
- an antibacterial agent based on zinc pyrithione and possibly silver ions as biocidal agent.

The adhesion promoter based on orthophosphoric acid is added in particular to decrease the pH of the paint or coating. In this way, an increase of free hydrogen ions in the formulation is obtained and a decrease of the cross-linking temperature of the paint is obtained once the coating has been spread on a substrate.

The adhesion promoter essentially activates the surface of the substrate, for example made of aluminum, since it acidifies the coating.

If desired, in the first reactor, before the insertion of the hydrophobic silica, a solvent, such as MEK or ethyl acetate, acetone or butyl, designated to control the viscosity is inserted.

The insertion of the powder components is preferably carried out in a reaction cabin, so as to ensure the safety of the operators without dispersing particulate matter into the environment.

As an alternative to the above described method, one could proceed as follows.

In a first reactor, such as a 200 L Teflon-coated cylindrical bin, 20-40%, for example 30% of hydrophobic powdered silica, is added, then 30-50%, if desired 40% of liquid polyester resin and 40-60%, if desired 50% of the solvent, such as MEK, ethyl acetate, acetone or butyl are added.

The thus obtained mixture is then left under stirring, if desired, for 20 minutes, until the powder is completely dispersed. The speed and frequency of the impeller can be as indicated above.

Subsequently, 30-50%, if desired 40% of hydrophobic silica in powder and then 30-50%, if desired 40% of the resin are added and everything is left under constant stirring, if desired for 20 minutes, until complete dispersion.

While the above formulation is under stirring, the remaining hydrophobic silica powder is slowly added, by dispersing it with a sieve, and then all the remaining resin and all the remaining solvent are added.

At the same time, all the other additives are added in a second reactor, if desired a 50-100 L Teflon bin, in sequence as required for the insertion into the second reactor according to the above described method.

The insertion of the following components, if required, is carried out under stirring:
silane with —OH group,
antibacterial,
anchoring agent.

The content of the second reactor is then slowly poured into the first. This operation is carried out by maintaining a vigorous and constant stirring in the first reactor.

At the end of this operation, it is possible to add the whitening/bleaching agent under stirring.

The thus obtained formulation is kept under constant stirring for 20-30 minutes and then the viscosity is checked with a Ford 4 cup. Optionally, it is possible to adjust the viscosity by lowering it with solvent additions under stirring.

The application of a composition according to the present invention can be done with any suitable method, for example by painting, spraying or spreading, with doctor blade chamber with engraved anilox, roto, flexo or semiflexo system, rotogravure, etc.

It has been found that owing to a composition and a method in accordance with the present invention it is possible to obtain a compact, resistant and above all hydrophobic coating.

In this regard, applications in the field of anti-corrosion are very important, since, if the coating is hydrophobic, the water that should fall on it would tend to flow away, so that it would be difficult to determine the trigger of the corrosive process. Moreover, the obtainable coating is preferably smooth and homogeneous, so that it ensures resistance to corrosion even at different pHs.

In this regard, wettability is the ability of a liquid to maintain contact with a solid surface. It is related to the intermolecular interactions that are present when the liquid phase and the solid phase come into contact.

The degree of wettability is determined by the balance between the adhesion and cohesion energies of the liquid itself.

In this regard, the adhesion energy is the energy of attraction between different molecular species, so in the case of liquid-solid, it is the energy that allows a drop of liquid to cover a solid surface.

The cohesion energy, on the other hand, is the energy of attraction between molecules of the same type, so in the case of liquid-solid, it is the energy that allows a drop of liquid to avoid contact with a solid surface.

Considering an ideal solid surface, be it rigid, smooth and homogeneous, when a drop of liquid is deposited on this solid surface, there are three interfaces: Liquid-Vapor, Solid-Liquid and Solid-Vapor.

The wettability of a surface is a physical property and is defined by equilibrium or Young's contact angle θ.

The contact angle is between the solid surface and the tangent to the liquid surface, at the point of contact between the three phases. That of equilibrium is the resultant between the equilibrium of the cohesive and adhesive forces.

At equilibrium, the net force acting along the boundary line between the phases must be zero, for which Young's equation is valid [2].

$$Y_{SG} - Y_{SL} - Y_{LG} \cos \theta = 0$$

The surface tensions of both the solid and the liquid are responsible for the wettability of the surfaces.

Generally, a solid surface can be wetted by a liquid, only if this liquid has a surface tension lower than the solid.

Therefore, the surface free energy is defined:
hydrophilic surface if the water spreads over the surface, $0 < \theta < 90°$ and good adhesiveness occurs between solid and liquid, and
it is defined hydrophobic, if the drops of water flow on the surface, $\theta > 90°$ and there is poor adhesion between solid and liquid.

A coating or paint according to the present invention, once lacquered or applied to a substrate, for example made of aluminum or one of the other above indicated materials, has shown hydrophobic and anti-corrosion characteristics.

This was demonstrated by tests carried out on samples made of different materials, including copper, steel, iron, aluminum, polymer or glass, with a thickness of 80 µm, on which 5 g/m2 of the composition was spread.

The characterizations carried out are the following:
atomic force microscopy (AFM),
contact angle measurements (both with polar and non-polar liquid),
profilometry measurements.

Atomic force microscopy (AFM) analyzes were conducted using a software-controlled NSCRIPTOR system SPMcockpit (NanoInk, Skokie, IL) in tapping mode, with a scanning frequency of 0.2 Hz and using ACT type silicon tips (AppNano, Santa Clara, CA). The images were collected on areas of 5×5 µm2, 10×10 µm2, 50×50 µm2 and 85×85 µm2, in order to acquire information related to surface roughness on different scales.

AFM measurements are aimed at evaluating the surface morphology of the analyzed sample, with particular reference to its mean square roughness Rq.

FIG. 1 shows images relating to the topographic scans of the surfaces of the analyzed samples.

As can be seen from FIG. 1, the sample had a relatively homogeneous surface. In general, the mean square roughness values reported for the investigated scan widths are homogeneous with each other. The slightly higher values observed in the 50×50 µm2 and 85×85 µm2 scans indicate a substantial representativeness of the result obtained.

Figure 2:
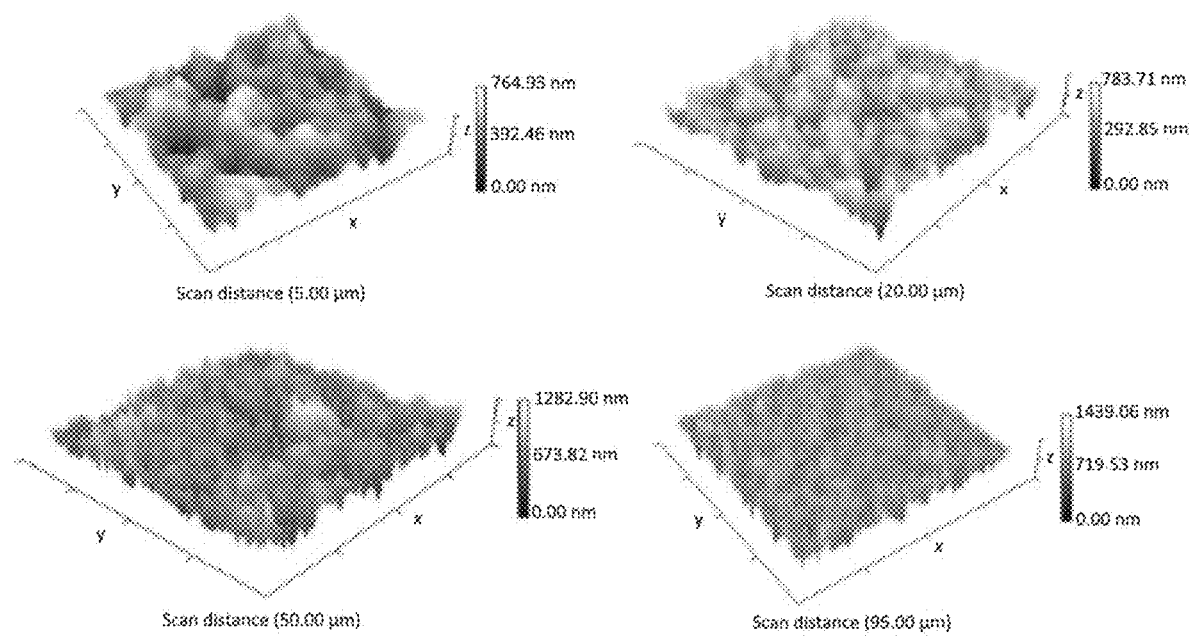

FIG. 2 shows the same images in 3D format, in which in clockwise, starting from the image at the top left, the following scans are shown 5×5 μm2, 10×10 μm2, 50×50 μm2 and 85×85 μm2.

As instead regards the contact angle measurements, they were carried out at room temperature using an OCA 20 (Data Physics) system equipped with a CCD camera and a 500 μm Hamilton syringe to dispense drops of liquid. Measurements were conducted using water and diiodomethane as probe liquids. The evaluation of the surface energy was conducted using the approach proposed by Owens, Wendt, Rabel, Kaelble (OWRK), which considers the geometric mean of the dispersive and polar components of the surface tension of the liquid and the surface energy of the solid.

To ensure the reproducibility and representativeness of the test, a minimum of 20 measurements in different areas of the surface for each of the probing liquids were collected for the purposes of evaluating the wettability of the sample and the relative surface energy, and the results were averaged on the basis of what obtained from these measures.

The following table shows the values obtained from the measurements of the contact angle with water and diiodomethane for the sample analyzed in two different areas of the lacquered sheet (±standard deviation on the measurements made).

| Sample | Angle of contact water $\Theta_{H2O}$ [°] | Angle of contact diiodomethane $\Theta_{DIM}$ [°] | Surface Energy Y [mN/m] | Dispersive component of the surface energy $Y_d$ [mN/m] | Polar component of the surface energy $Y_p$ [mN/m] |
|---|---|---|---|---|---|
| Zone 1 | 125.1 ± 16.0 | 78.5 ± 4.3 | 20.79 ± 2.8 | 20.35 ± 1.7 | 0.44 ± 0.1 |
| Zone 2 | 145.7 ± 6.0 | 89.3 ± 9.4 | 19.16 ± 0.8 | 16.48 ± 0.5 | 2.69 ± 0.2 |

Measurements were recorded 3 seconds after the drop touched the substrate and it detached from the syringe.

So far as the profilometry is concerned, the thickness of the coating deposited on the substrate was measured by optical profilometry using a Microfocus profilometer (UBM).

The analysis was conducted by collecting 4 measurements in different points of the sample and the result is reported in terms of mean value±standard deviation on the measurements taken: coating thickness: 1.9±0.2 μm.

When considering the verified analyzes, it can be stated that the coating shows marked hydrophobic characteristics, since the contact angle with water is greater than 90° and, in some cases, it is very close to the super-hydrophobicity range (Θ>150°).

From the verified analyzes it can also be stated that the coating shows marked oleophobic characteristics, depending on the contact angle with the diiodomethane. This is due in particular to the presence of the silicone modified with polyacrylate with functional groups —OH.

Preferably, once this coating has been applied and dried, it has a thickness between 0.5 and 5 μm.

This coating is compact and resistant and has high resistance to scotch (IQM 10 standard test based on an internal standard of CARCANO ANTONIO S.p.A.) as well as high resistance to corrosion in acidic, strongly oxidizing and neutral environments.

Moreover, this coating is in fact self-cleaning.

With regard to this aspect, since the composition or rather the respective coating is substantially hydrophobic, if any dust falls on it, it will slip away together with any drops of water that may deposit there, for example following rain or high humidity in the installation area.

If the composition contains a solution of polyacrylates modified with silicone with functional groups (—OH), a coating obtained by applying this composition could have oleophobic characteristics, and thus repellence towards non-polar solvents/liquids.

The presence of antimicrobial and antifungal agents would guarantee protection against bacterial and fungal proliferation.

Moreover, thanks to a composition according to the present invention, it is possible to obtain a coating capable of ensuring protection from atmospheric agents and resistance to NOx and SOx, a resistance in an ammonia environment at 5%, a resistance to neutral saline mist, a resistance to acetic saline mists, a resistance to strongly oxidizing environments such as hydrogen peroxide at 40% by volume.

Various tests were carried out to obtain a composition according to the present invention and it was noted that by increasing the resin concentration the hydrophobic capacities were lost, while by decreasing it too much, the anchoring properties on the substrate were lost.

In order to find this balance, more than 100 test batches were made, with the resulting characterizations.

The characterizations carried out are:

stability tests=at room temperature for at least 1 month, in a water bath on a static plate at 190° C. for 1 h, and in the refrigerator at 4° C. for 1 week.

Tirelli with green keybar. A weight of about 5 g/m2 is loaded and the surface appearance is observed. That is, if it is smooth and homogeneous or striped with halos.

Formulation of a hydrophobic lacquer obtained starting from a composition according to the present invention.

Adhesion test with scotch tape, this is a standardized method for evaluating the adhesion of the coating to the substrate.

Bending test, to observe the tightness of a coating obtained by means of the composition according to the present invention to mechanical action.

Water hydrophobicity test, evaluated with contact angle.

Atomic force microscopy, to evaluate its roughness (see in particular FIGS. 1 and 2).

Profilometry.

Regarding the profilometry tests, the thickness of the coating deposited on an aluminum sheet was measured by optical profilometry using a Microfocus profilometer (UBM).

The analysis was conducted by collecting 4 measurements in different points of the sample and the result is reported in terms of mean value±standard deviation on the measurements taken:

coating thickness: 1.9±0.2 μm.

With reference to the stability tests, they were carried out at room temperature, at 4° C. and in a bain-marie with an open vial.

As regards the stability at room temperature and at 4° C., the presence of precipitate was verified in line with what is found with the compositions according to the state of the art.

The bain-marie test was carried out to observe the behavior of the paint in a humid environment and it showed that the applied composition is not sensitive to humidity, as the coagulation of the coating was detected.

Moreover, in a laboratory, the mixing of the various components was carefully observed to obtain a composition according to the present invention and no coagulation and/or flocculation problems were detected.

The composition was very viscous, with the same consistency as a gel. It could be diluted without particular problems with ethyl acetate, thereby obtaining a homogeneous formulation.

Regarding the adhesion test with the scotch tape, an adhesion test with adhesive tape, Tesa tape test was carried out and no detachment of the coating was observed.

As regards the sealing test of the coating, the material was tested with invasive folds and no detachment of the coating was observed.

With reference to the hydrophobicity test, a very high contact angle was observed, obtaining the so-called "lotus effect".

The surface appearance of the applied coating was more "bleached" than the application of compositions according to the state of the prior art.

Continuous production of aluminum foils 80 μm and 200 μm lacquered or coated with a coating or paint obtained by applying a composition according to the present invention has been made.

To be precise, the following quantities were lacquered:
thickness: 80 μm-length: 52000 meters
thickness: 200 μm-length: 11000 meters The quantities produced show a stable production, during which no problems at the production level occurred.

The paint has always been very stable and it has never dirty the application machine.

For each coil of coated material produced, for both thicknesses, these in-line tests were carried out:
Adhesion test with scotch tape
Tightness test of the coating by bending
Hydrophobicity test
Surface aspect
Dust proof, simulated with flour
Sheets with a thickness of 80 μm
The processing proved satisfactory.
The composition did not cause stability problems.
The surface appearance of the coated foil coils was very good, it turned out to be smooth, homogeneous with a satin/white effect.

The sealing scotch and bending tests were considered suitable for all the coils produced. There was no detachment of the coating.

The hydrophobic effect was good, in particular a contact angle>90°, very close to 150° due to superhydrophobicity.

The powder effect, simulated with flour, was optimal for all 80 μm coils.

200 μm thick sheets
In terms of workability, the result was satisfactory.
Even in this case, the paint showed no instability problems.

In this case, the material, being a double-gloss (this feature depends on the lamination of aluminum with thicknesses >100 μm, both sides have shiny), it turned out to be brighter and less white.

The surface appearance of the coils was good.
The sealing scotch and bending tests were considered suitable for all the coils produced. There was no detachment of the coating.

The hydrophobic effect was lower (with contact angle between 90° and 150°) than sheets with thickness of 80 μm. This aspect can be improved, if more weight is loaded and the heating is increased with the ovens.

The powder effect, simulated with flour, was optimal for all coils of 200 μm.

Overall, a composition according to the present invention has a hydrophobicity better than traditional compositions, and furthermore, it has also a good adhesion, owing in particular to the anchoring agent.

Changes and variants of the invention are possible within the scope defined by the claims.

The invention claimed is:

1. A composition comprising:
   at least one hydrophobic silica comprising at least one pyrogenic silica, present at a percentage by weight between 30% and 60% or between 40% and 50% of the total weight of the composition,
   at least one polyester polymer resin present at a percentage by weight between 20% and 70% or between 20% and 60% of the total weight of the composition, and
   at least one anchoring agent present at a percentage by weight between 0.5% and 2% of the total weight of the composition, said at least one anchoring agent being designated to increase the anchoring of said composition to a substrate.

2. The composition according to claim 1, wherein said at least one hydrophobic silica is present at a percentage by weight between 45% and 47% of the total weight of the composition.

3. The composition according to claim 1, wherein said at least one pyrogenic silica is treated with dimethyldichlorosilane and/or polyacrylate-modified silicone with —OH functional groups.

4. The composition according to claim 3, wherein said at least one pyrogenic silica treated with dimethyldichlorosilane has a content of silica equal to 99.5-99.9% by weight.

5. The composition according to claim 1, wherein said at least one polyester polymer resin is present at a percentage by weight between 40% and 70% or between 40% and 60% of the total weight of the composition.

6. The composition according to claim 1, wherein said at least one polyester polymer resin is present at a percentage by weight between 51% and 53% of the total weight of the composition.

7. The composition according to claim 1, further comprising at least one biocidal agent present at a percentage by weight between 0.05% and 0.3% of the total weight of the composition.

8. The composition according to claim 7, wherein said at least one biocidal agent is present at a percentage by weight between 0.1% and 0.2% of the total weight of the composition.

9. The composition according to claim 7, wherein said at least one biocidal agent is present at a percentage by weight between 0.15% and 0.17% of the total weight of the composition.

10. The composition according to claim 7, wherein said at least one biocidal agent comprises an antibacterial, antifungal, anti-mould, anti-algae and/or virucidal agent.

11. The composition according to claim 10, wherein said at least one virucidal agent comprises:
    a mixture of 1,2-Benzisothiazol-3 (2H) and 1,2-Benzisothiazolin-3-one,
    N-(3 aminopropyl)-N-dodecylpropane-1,3-diamine, and/or a mixture of 3-iodo-2-propinyl butylcarbamate and 3-iodoprop-2-in-1-butylcarbamate.

12. The composition according to claim 7, wherein said biocidal agent comprises at least one compound selected from the group consisting of zinc pyrithione, silver ions and isothiazolinone.

13. The composition according to claim 1, wherein said anchoring agent is present at a percentage by weight between 0.8% and 1% of the total weight of the composition.

14. The composition according to claim 13, wherein said anchoring agent is present at a percentage by weight between 0.92% and 0.98% of the total weight of the composition.

15. The composition according to claim 1, further comprising at least one bleaching/opacifying agent at a percentage by weight between 0.5% and 3% of the total weight of the composition.

16. The composition according to claim 15, wherein said at least one bleaching/opacifying agent is selected from the group consisting of paraffin, talc, anhydrous citric acid, silicas and silanes.

17. The composition according to claim 15, wherein said at least one bleaching/opacifying agent does not comprise titanium dioxide.

18. A method of using the composition according to claim 1 comprising: applying the composition as a coating to surfaces of substrates or sheets or components made of copper, steel, iron, aluminum, polymer or glass.

19. A method of using the composition according to claim 1 as a hydrophobic and/or anti-corrosive coating paint comprising:
applying the composition to surfaces of glass sheets or components comprising hydrophobic and satin finish paint,
applying the composition to surfaces of aluminum sheets or components used to form panels made of polyurethane foam,
applying the composition to inner or outer panels made of copper, steel, iron, or aluminum, or
applying the composition to roofs, corrugated roofs, or cladding panels.

20. A composition comprising:
at least one hydrophobic silica comprising at least one pyrogenic silica, present at a percentage by weight between 1% and 60% of the total weight of the composition,
at least one polyester polymer resin present at a percentage by weight between 20% and 80% of the total weight of the composition,
at least one anchoring agent present at a percentage by weight between 0.5% and 2% of the total weight of the composition, said at least one anchoring agent being designated to increase the anchoring of said composition to a substrate, and
at least one biocidal agent present at a percentage by weight between 0.05% and 0.3% of the total weight of the composition.

21. The composition according to claim 20, wherein:
the at least one hydrophobic silica is present at a percentage by weight equal to 46.3% of the total weight of the composition,
the at least one polyester polymer resin is present at a percentage by weight equal to 52.6% of the total weight of the composition,
the at least one biocidal agent is present at a percentage by weight equal to 0.16% of the total weight of the composition, and
the at least one anchoring agent is present at a percentage by weight equal to 0.94% of the total weight of the composition.

22. A method for preparing a composition according to claim 20, comprising the following steps:
providing at least two reactors,
inserting a first part of said at least one polyester polymer resin into a first reactor of said at least two reactors,
activating a first stirrer in said first reactor before or after inserting said first part of said at least one polyester polymer resin,
slowly adding a first portion of said at least one hydrophobic silica to said first reactor at room temperature while keeping said first stirrer activated, so as to facilitate the complete and homogeneous dispersion thereof in said first part of said at least one polyester polymer resin,
inserting a second part of said at least one polyester polymer resin into a second reactor of said at least two reactors,
activating a second stirrer in said second reactor before or after inserting said second part of said at least one polyester polymer resin,
adding a second portion of said at least one hydrophobic silica, said at least one biocidal agent and said at least one anchoring agent into said second reactor while keeping said second stirrer activated, so as to subject said second part of said at least one polyester polymer resin, said second portion of said at least one hydrophobic silica, said at least one biocidal agent and said at least one anchoring agent to stirring, and
slowly pouring the content of the second reactor into the first reactor while maintaining a vigorous and constant stirring in the first reactor.

23. The method according to claim 22, wherein the materials added to said second reactor comprise: pyrogenic silica treated with polyacrylate-modified silicone with —OH functional groups, as said at least one hydrophobic silica; an adhesion promoter based on orthophosphoric acid, as said at least one anchoring agent; and an antibacterial agent based on zinc pyrithione and optionally silver ions, as said at least one biocidal agent.

24. The method according to claim 22, further comprising inserting a solvent into the first reactor before slowly adding the first portion of said at least one hydrophobic silica, to control the viscosity.

* * * * *